Jan. 16, 1951  F. TRATZIK  2,538,133
CONTROL VALVE
Filed Sept. 10, 1945  2 Sheets-Sheet 1

Inventor
FREDERICK TRATZIK

Jan. 16, 1951   F. TRATZIK   2,538,133
CONTROL VALVE
Filed Sept. 10, 1945   2 Sheets-Sheet 2
FIG. 4
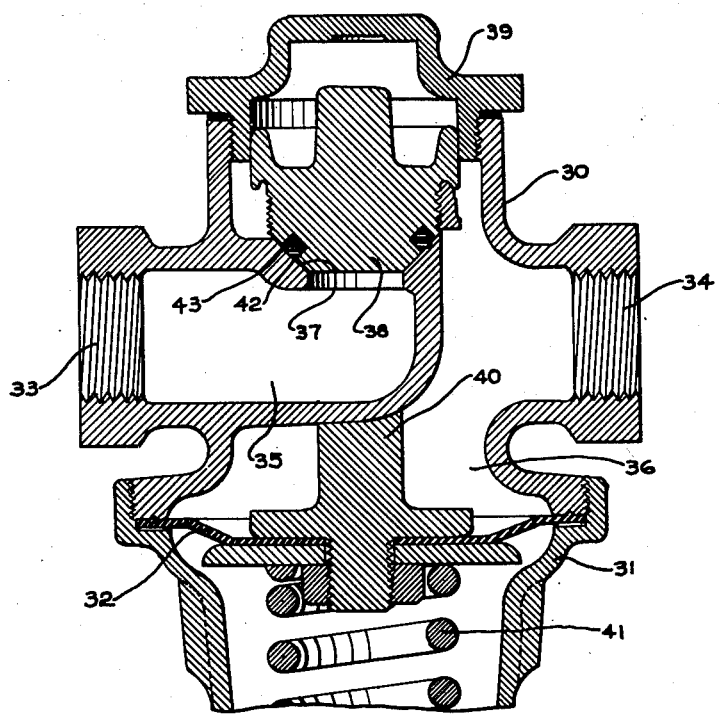
FIG. 5
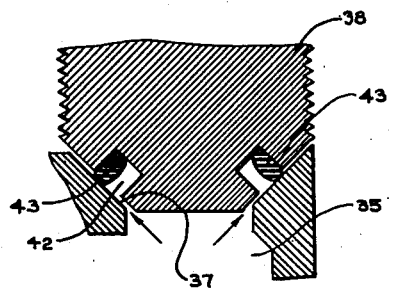
FIG. 7
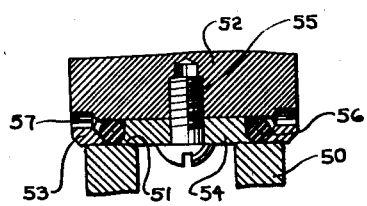
FIG. 6
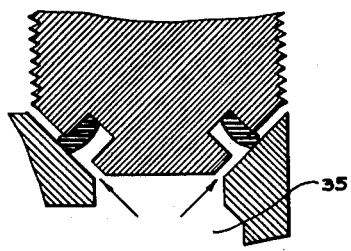
FIG. 8
Inventor
FREDERICK TRATZIK
By Cushman Darby & Cushman
Attorneys Patented Jan. 16, 1951

2,538,133

UNITED STATES PATENT OFFICE 2,538,133

CONTROL VALVE

Frederick Tratzik, Decatur, Ill., assignor to Mueller Co., Decatur, Ill., a corporation of Illinois Application September 10, 1945, Serial No. 615,392

12 Claims. (Cl. 50—23)

This invention relates to automatic control valves such as relief valves and pressure regulating valves and has as its object to provide in such valves a snap opening action whereby an initial flow clearance of substantial size is instantaneously provided when the valve is opened. This object is attained by providing the valve with cooperating seat and movable valve elements of which one, preferably the valve element, carries an O-ring adapted to maintain a seal during the first part of the opening movement of the movable valve element, then breaking away and instantaneously recovering its original cross section so that substantial flow clearance is instantaneously provided. Illustrative embodiments of the invention are shown in the accompanying drawings in which, Figure 1 shows a relief valve partly in axial section and partly in elevation, Figure 2 is an enlarged section of the seat and valve elements of Figure 1 but with the spacing between the seating surfaces exaggerated, the parts being shown in closed relation, Figure 3 shows the parts of Figure 2 in partly open relation, Figure 4 is an axial section of a pressure regulating valve in accordance with the invention, Figure 5 is an enlarged view of the seat and cooperating movable valve elements, of Figure 4 with the parts in closed position but with the spacing between the seating surfaces exaggerated, Figure 6 shows the parts of Figure 5 in partly open position, Figure 7 shows in axial section modified seat and movable valve elements usable in place of those shown in Figure 1, and Figure 8 shows in axial section modified seat and movable valve elements usable in place of those shown in Figure 4.

Figure 1:
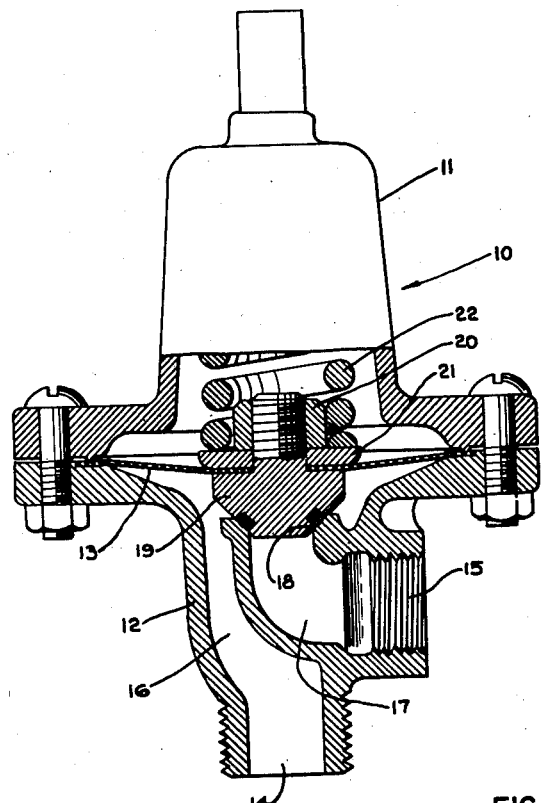

Referring to Figure 1, reference numeral 10 designates a housing comprising parts 11 and 12 bolted together through opposed flanges between which a diaphragm 13 is clamped. Portion 12 has an inlet port 14 and an outlet port 15 connected by a flow passage which includes an inlet chamber 16 and an outlet chamber 17, the latter being provided with a conical seat 18 spaced below and faced directly toward the diaphragm. Reference numeral 19 designates a movable valve element having a shank passed through the diaphragm and having threaded thereon a nut 20 by which the diaphragm is engaged between the head portion of element 19 and the washer 21. A compression spring 22 bears at one end against the washer and at the other against an adjustable abutment in casing portion 11. The head of the movable valve element has the same conicity as the seat 18 and its surface opposed to the seat is provided with an annular groove 23, here shown as of rectangular section, which freely receives an O-ring 24. As shown in Figure 1, the O-ring has a normally circular section. It is made of elastic rubber or rubber-like material.

Figures 2, 3:
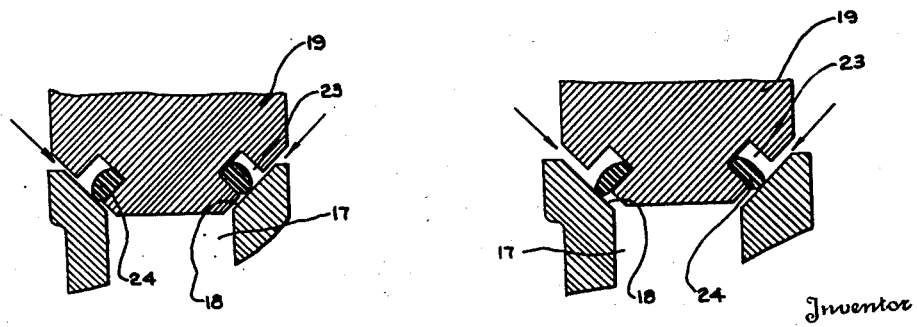

When valve element 19 is engaged with the seat, as shown in Figure 2 (wherein the spacing between the seat surfaces is exaggerated), with fluid pressure existing in the inlet chamber 16, the pressure, acting in the direction of the arrows, reaches the O-ring and deforms it in the manner illustrated so that a seal is perfected between the two elements. The pressure has access to the sealing ring since the opposed metal surfaces of the seat and valve element do not provide a tight seal. If the valve element is given an opening movement away from the seat due to upward flexure of the diaphragm against the force of spring 22, further deformation of the ring will occur substantially as shown in Figure 3, the ring being further flattened against the lower wall of the groove with increased protrusion from the groove so that a seal is still maintained. When element 19, in its continued opening movement, moves farther away from the seat the limit of distortion of the O-ring under the existing pressure is reached and the ring breaks away from the seat and instantaneously recovers its original section in the groove, thus clearing the substantial space which exists between valve element 19 and the seat so that initial flow of substantial volume can take place.

A relief valve such as has been described is shown in Patent No. 2,074,292, J. M. Wilkins, March 16, 1937, except that in the patent, the movable valve element is equipped with a hard washer which engages the seat. The valve member opens very gradually and sometimes will not relieve the pressure because the condition which has caused the excess pressure will keep up with the flow through the valve. As opposed to this, when the O-ring according to the present invention snaps away from the seat, the valve is practically wide open so that pressure is immediately relieved. When the valve is closed, the seal is immediately re-established.

In Figure 4 there is shown a pressure regulating valve of the type disclosed in Patent No. 1,651,237, Wilkins, November 29, 1927. The valve comprises a casing including portions 30 and 31 between which is clamped a diaphragm 32. Portion 30 has an inlet port 33 and an outlet port 34 connected by a flow passage which includes an inlet chamber 35 and an outlet chamber 36. The outlet side of the inlet chamber is formed to provide a seat 37 having an annular conical seating surface engageable by a similar surface of a movable valve element 38, the seat being faced directly away from the diaphragm. Element 38 is guided in a cap 39 and is secured to the diaphragm through a yoke 40, the diaphragm having working thereagainst an adjustable compression spring 41 in housing portion 31. The annular seating surface of element 38 is provided with an annular groove 42, here shown as being of rectangular section, which freely receives an O-ring 43 of normally circular section.

In this case, the pressure in the inlet chamber, acting in the direction of the arrows, Figure 5, squeezes the ring 43 against the outer wall of the groove so that the ring is flattened somewhat in the manner shown and perfects a seal between the two elements. As element 38 moves away from the seat, deformation of the sealing ring continues, as shown in Figure 6, so that the seal is still maintained. When the ring snaps back into the groove an annular flow space of substantial size exists so that initial flow of substantial volume can instantaneously occur.

When a regulator such as is shown in the last mentioned patent is set, say to reduce 100 pounds inlet pressure to an outlet pressure of 50 pounds per square inch, the seat washer will contact the seat member at about 44 pounds per square inch and the back pressure must build up an additional 6 pounds to tightly close the valve. This additional pressure is usually referred to as the lock-off pressure. When flow is started through the regulator, as by opening a faucet in a water line, the delivery pressure will immediately drop to 44 pounds and will continue to drop as the volume of flow through the regulator is increased. Assuming that the rated capacity flow is about 17 gallons per minute, the delivery pressure at such a rate of flow will drop from the 50 pounds for which the valve was set to about 35 pounds per square inch.

The effect of using the O-ring in the pressure regulator is practically to eliminate the necessity of a lock-off pressure for the valve will tightly seal under a fraction of a pound of pressure per square inch after the O-ring contacts the seat. When a faucet is opened in the line, and the snap action of the O-ring has occurred, the volume of flow through the valve will so maintain the delivery pressure that, at capacity flow of 17 gallons per minute, it will be about 40 pounds per square inch instead of 35 pounds.

In Figure 7, reference numeral 50 designates a tubular portion of a flow passage having a flat seat 51 cooperable with a movable valve element 52 operable by a movable wall in the form of a diaphragm as in Figure 1. The head is provided with a circular recess so as to form an annular undercut rim 53 and a disc 54 is secured in the recess by a screw 55, the disc having an undercut edge so that an outwardly tapering groove is provided above the seat 51. An O-ring 56 having a normally circular section is retained in the groove and is subjected to inlet pressure through orifices 57 leading into the top of the groove. The pressure entering the groove acts to deform the ring so that a seal is effected, the seal persisting for a period during the opening of the valve with the same result as previously described, the undercut walls of the groove serving to prevent expulsion of the ring.

Figure 8 shows how in a pressure regulating valve, such as is shown in Figure 4, pressure can be admitted to the top of the groove through openings 58 and channels 59 in disc 54a.

Other changes in the form and arrangement of parts are contemplated under the invention as defined in the following claims.

I claim:

1. A control valve comprising a housing having an inlet port and an outlet port and a flow passage connecting said ports, flow controlling means in said passage comprising a seat element and a cooperating valve element movable toward and away from said seat element, said elements having opposed annular surfaces, one of said surfaces being provided with an annular groove, a resilient O-ring in said groove and accessible to fluid pressure existing in said passage at one side of said seat when said valve element is in closed position whereby to be deformed into sealing engagement with the surface opposed to said groove, said ring being constructed and arranged to be further deformable by the pressure acting thereon so as to maintain the seal during the first part of the movement of said valve element away from said seat element and upon the continued movement away of said valve element breaking from said seat element and instantaneously recovering its normal form so that flow clearance for initial flow of substantial volume is provided; and operating means for said valve element comprising a movable wall in said housing subjected to fluid pressure existing in said passage at one side of said seat, means yieldingly opposing movement of said wall under said pressure, and means for transmitting movement of said wall to said valve element.

2. Structure according to claim 1 in which said surfaces are conical and the groove is formed in the valve element.

3. Structure according to claim 1 in which said surfaces are substantially flat, in which the grooved element is provided with orifices for conducting deforming pressure to the groove, and in which the groove is outwardly constricted so as to retain the ring against expulsion from the groove.

4. Structure according to claim 1 in which said surfaces are substantially flat, in which the groove is formed in the valve element, in which the valve element is provided with orifices for conducting deforming pressure to the groove, and in which the groove is outwardly constricted so as to retain the ring against expulsion from the groove.

5. A relief valve comprising a housing having an inlet port and an outlet port and a flow passage connecting said ports, flow controlling means in said passage comprising a seat element faced against the direction of flow and a cooperating valve element movable toward and away from said seat element, said elements having opposed annular surfaces, one of said surfaces being provided with an annular groove, a resilient O-ring in said groove and accessible to inlet pressure when said valve element is in closed position whereby to be deformed into sealing engagement with the surface opposed to said groove, said ring being constructed and arranged to be further deformable by the pressure acting thereon so as to maintain the seal during the first part of the movement of said valve element away from said seat element and upon the continued movement away of said valve element breaking from said seat element and instantaneously recovering its normal form so that flow clearance for initial flow of substantial volume is provided; and operating means for said valve element comprising a movable wall in said housing subjected to inlet pressure; means yieldingly opposing movement of said wall under said pressure, and means for transmitting movement of said wall to said valve element.

6. Structure according to claim 5 in which said surfaces are conical and the groove is formed in the valve element.

7. Structure according to claim 5 in which said surfaces are substantially flat, in which the grooved element is provided with orifices for conducting deforming pressure to the groove, and in which the groove is outwardly constricted so as to retain the ring against expulsion from the groove.

8. Structure according to claim 5 in which said surfaces are substantially flat, in which the groove is formed in the valve element, in which the valve element is provided with orifices for conducting deforming pressure to the groove, and in which the groove is outwardly constricted so as to retain the ring against expulsion from the groove.

9. A pressure regulating valve comprising a housing having an inlet port and an outlet port and a flow passage connecting said ports, flow controlling means in said passage comprising a seat element faced in the direction of flow and a cooperating valve element movable toward and away from said seat element, said elements having opposed annular surfaces, one of said surfaces being provided with an annular groove, a resilient O-ring in said groove and accessible to inlet pressure when said valve element is in closed position whereby to be deformed into sealing engagement with the surface opposed to said groove, said ring being constructed and arranged to be further deformable by the pressure acting thereon so as to maintain the seal during the first part of the movement of said valve element away from said seat element and upon the continued movement away of said valve element breaking from said seat element and instantaneously recovering its normal form so that flow clearance for initial flow of substantial volume is provided; and operating means for said valve element comprising a movable wall in said housing subjected to outlet pressure, means yieldingly opposing movement of said wall under said pressure, and means for transmitting movement of said wall to said valve element.

10. Structure according to claim 9 in which said surfaces are conical and the groove is formed in the valve element.

11. Structure according to claim 9 in which said surfaces are substantially flat, in which the grooved element is provided with orifices for conducting deforming pressure to the groove, and in which the groove is outwardly constricted so as to retain the ring against expulsion from the groove.

12. Structure according to claim 9 in which said surfaces are substantially flat, in which the groove is formed in the valve element, in which the valve element is provided with orifices for conducting deforming pressure to the groove, and in which the groove is outwardly constricted so as to retain the ring against expulsion from the groove.

FREDERICK TRATZIK.

REFERENCES CITED

The following references are of record in the file of this patent:

UNITED STATES PATENTS

| Number | Name | Date |
|---|---|---|
| 763,208 | Robinson | June 21, 1904 |
| 874,652 | Bailey | Dec. 24, 1907 |
| 1,157,196 | Von Philip | Oct. 19, 1915 |
| 1,450,052 | Smith | Mar. 27, 1923 |
| 1,651,237 | Wilkins | Nov. 29, 1927 |
| 1,654,772 | Akeyson | Jan. 3, 1928 |
| 1,721,114 | Hampton | July 16, 1929 |
| 1,863,075 | Terry | June 14, 1932 |
| 2,083,584 | Wineman | June 15, 1937 |
| 2,314,683 | Berry | Mar. 23, 1943 |
| 2,397,269 | Kelly | Mar. 26, 1946 |
| 2,431,437 | VanDerWerff | Nov. 25, 1947 |
| 2,481,482 | Green | Sept. 13, 1949 |

FOREIGN PATENTS

| Number | Country | Date |
|---|---|---|
| 9,164 | Great Britain | June 22, 1915 |
| 12,911 | Great Britain | June 7, 1904 |
| 40,549 | Germany | of 1887 |
| 431,474 | Germany | July 12, 1926 |